United States Patent [19]
Holmes

[11] 3,961,010
[45] June 1, 1976

[54] METHOD OF MANUFACTURING HEAT EXCHANGERS

[75] Inventor: Robert Taylor Holmes, Cheltenham, England

[73] Assignee: Serck Industries Limited, Birmingham, England

[22] Filed: June 28, 1973

[21] Appl. No.: 374,322

[30] Foreign Application Priority Data
June 28, 1972 United Kingdom............... 30244/72

[52] U.S. Cl................................ 264/221; 264/226; 264/254; 264/255; 264/261; 264/277; 264/278; 264/317

[51] Int. Cl.².................... B29C 1/08; B29D 31/00

[58] Field of Search............ 264/DIG. 44, 221, 261, 264/275, 277, 294, 296, 317, 226, 250, 254, 278, 255; 165/173, 175, 178, 180, 186; 425/DIG. 12; 164/108, 132, 137, 333

[56] References Cited
UNITED STATES PATENTS

| | | | |
|---|---|---|---|
| 3,255,280 | 6/1966 | Burrowes............................ | 264/277 |
| 3,529,054 | 9/1970 | Hepner............................... | 264/261 |
| 3,730,959 | 5/1973 | Horres et al........................ | 264/263 |

FOREIGN PATENTS OR APPLICATIONS
1,040,284  8/1966  United Kingdom................. 165/173

*Primary Examiner*—Robert F. White
*Assistant Examiner*—W. E. Hoag
*Attorney, Agent, or Firm*—Holman & Stern

[57] ABSTRACT

A method of manufacturing a heat exchanger comprises temporarily suporting a number of tubes in a first mould using a plurality of removable tube plates. The first mould is then filled with a molten, low melting alloy. After the alloy has set, the assembly is removed from the first mould and the tube plates are disintegrated by solvent or chemical action. The assembly of tubes supported by the set alloy is then inserted into a second mould and plastic material is injected into the mould to form a thin shell around the tubes and alloy and may also form header tanks of the heat exchanger. Finally, the whole assembly is removed from the second mould and the alloy is melted out to leave the completed heat exchanger. The method is also applicable to the manufacture of other hollow articles having a complex internal configuration.

14 Claims, 5 Drawing Figures

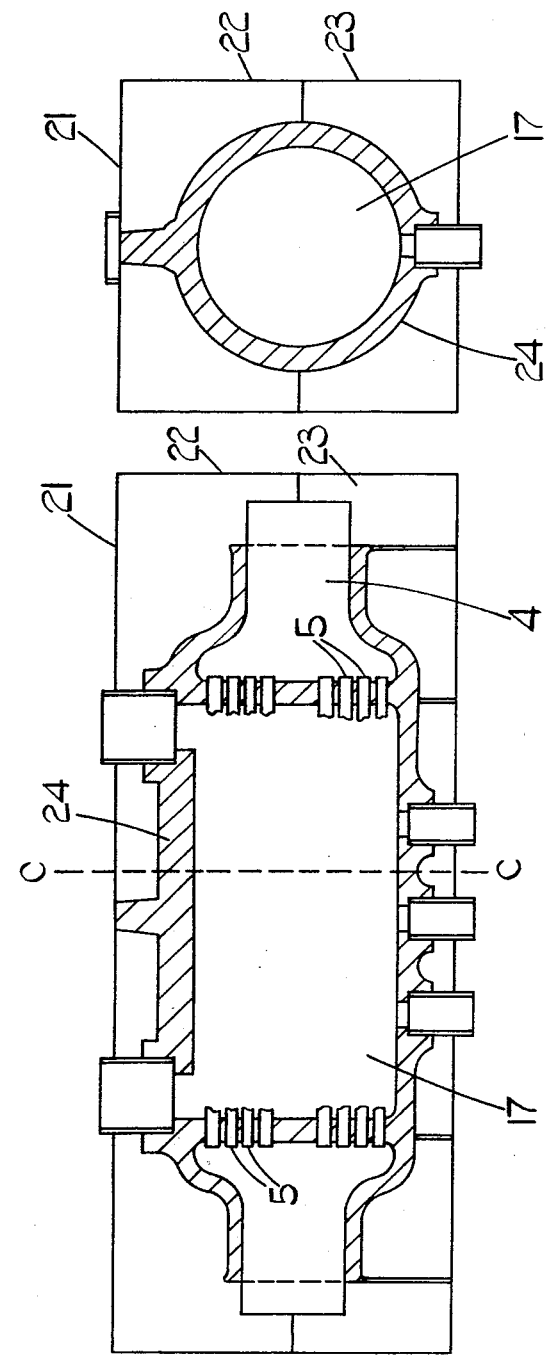

METHOD OF MANUFACTURING HEAT EXCHANGERS

This invention relates to methods of manufacturing hollow articles having complex internal configurations and is particularly, though not exclusively, concerned with the manufacture of heat exchangers.

According to one aspect of the present invention, there is provided a method of manufacturing a hollow article having a complex internal configuration, comprising the steps of inserting at least one removable fugitive core into a first mould, introducing a flowable, solidifiable fugitive material into the first mould, allowing said flowable material to solidify, removing the moulded, solid material and said at least one core from the first mould, removing the said at least one core from the moulded solid material, inserting said solid material into a second mould which defines the external form of the article, feeding a settable material into the second mould so as to occupy the space previously occupied by said at least one core and to adopt said external form, allowing the settable material to set, removing the set material and the solid material from the second mould, and removing the solid material from the set material to leave the hollow article defined by the now hollow set material.

The said at least one core may be removed from the moulded material by a melting, dissolving or disintegrating technique.

The solid material may be removed from the set material by a dissolving, melting or disintegrating technique.

The method may further include the step of temporarily supporting in the first mould at least one member which is intended to remain in the finished hollow article. The said at least one member may be temporarily supported in the first mould by the said at least one removable core.

According to another aspect of the present invention, there is provided a method of manufacturing a heat exchanger including the steps of temporarily supporting a plurality of tubes by means of at least one removable, fugitive tube plate, inserting at least part of the assembly of temporarily supported tubes into a first mould which defines the internal form of at least one hollow component of the exchanger, feeding a flowable, solidifiable fugitive material into the first mould so as to abut at least one tube plate and to adopt said internal form, allowing the said solidifiable material to solidify so that the tubes are held in position by the now solid material, removing the assembly of tubes and solid material from the first mould, removing at least one fugitive tube plate, inserting at least part of the assembly of tubes and solid material into a second mould which defines the external form of said at least one hollow component of the heat exchanger, feeding a settable material into the second mould so as to occupy the space previously occupied by at least one fugitive tube plate and also to adopt the said external form, allowing the settable material to set, removing the assembly of tubes, set material and solid material from the second mould and removing the solid material from the set material to leave the tubes supported by the set material.

The first and second moulds may define the internal and external forms, respectively, of a casing (shell) surrounding the tubes and/or at least one header tank (channel) for the completed heat exchanger.

The method may also include the steps of inserting removable baffle plates onto the tubes before the assembly is inserted into the first mould, and removing said removable baffle plates before the assembly is inserted into the second mould. Preferably, the removable plates are formed of a material which can be disintegrated either by solvent action or by chemical action.

Preferably, the solidifiable, fugitive material is a low melting point alloy.

Also according to the present invention, there is provided a heat exchanger when manufactured by the method as defined in any one of the last preceding five paragraphs.

An embodiment of the present invention will now be described, by way of example, with reference to the accompanying drawings, in which:

FIG. 4 is a side view of a second mould for use in manufacturing a heat exchanger according to the present invention; and FIG. 5 is a sectional view taken along line C—C of FIG. 4.

The heat exchanger produced by the method according to the present invention comprises, generally, a bundle of spaced parallel tubes supported at their ends by tube plates and having three baffle plates intermediate the tube plates a casing surrounding the tube bundle, and a header tank at each end of the tube bundle.

Figure 1:
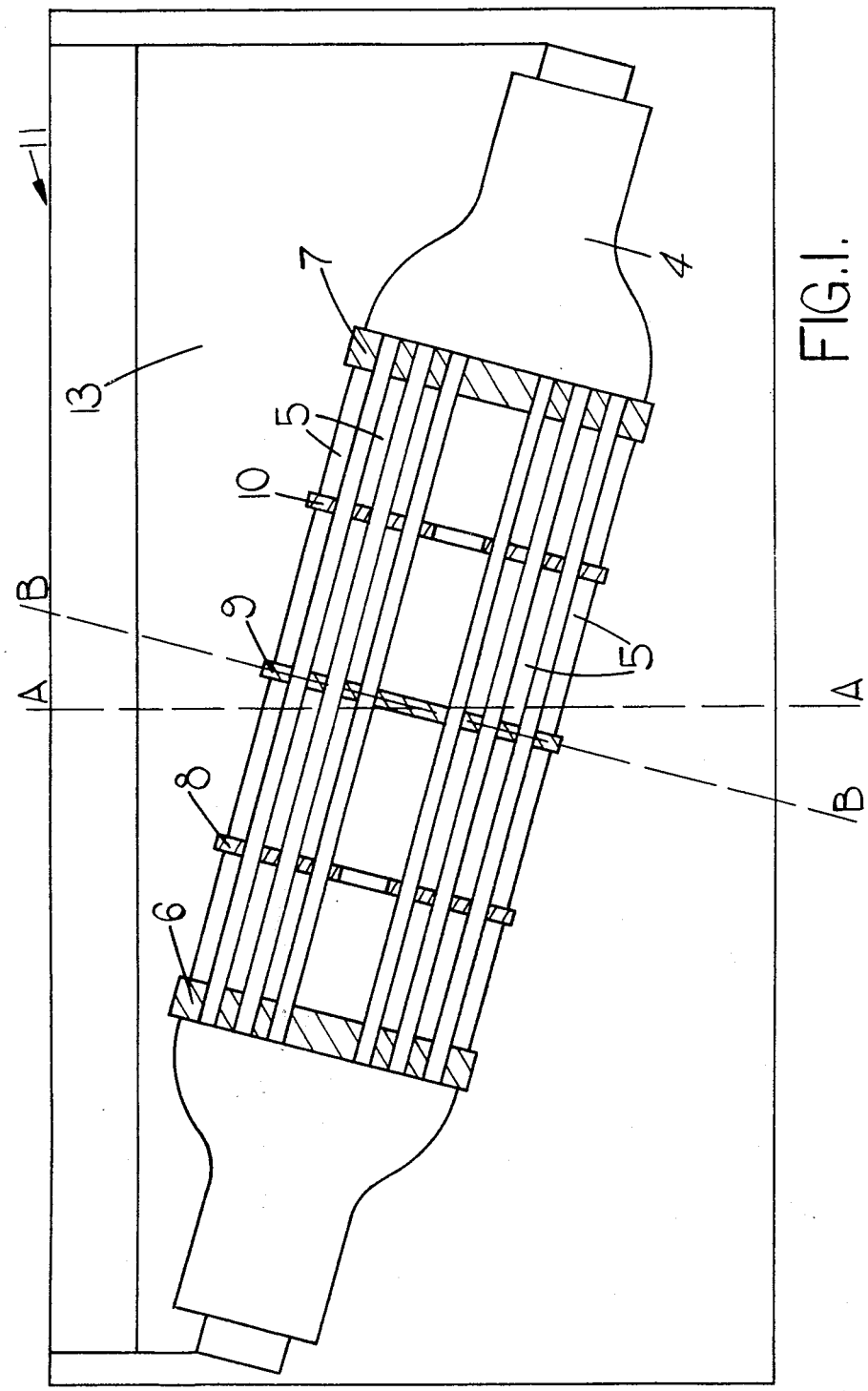
FIG. 1 is a side view of a first mould for use in a method of manufacturing a heat exchanger according to the present invention, in which first mould is mounted a supported tube bundle.
Figure 2:
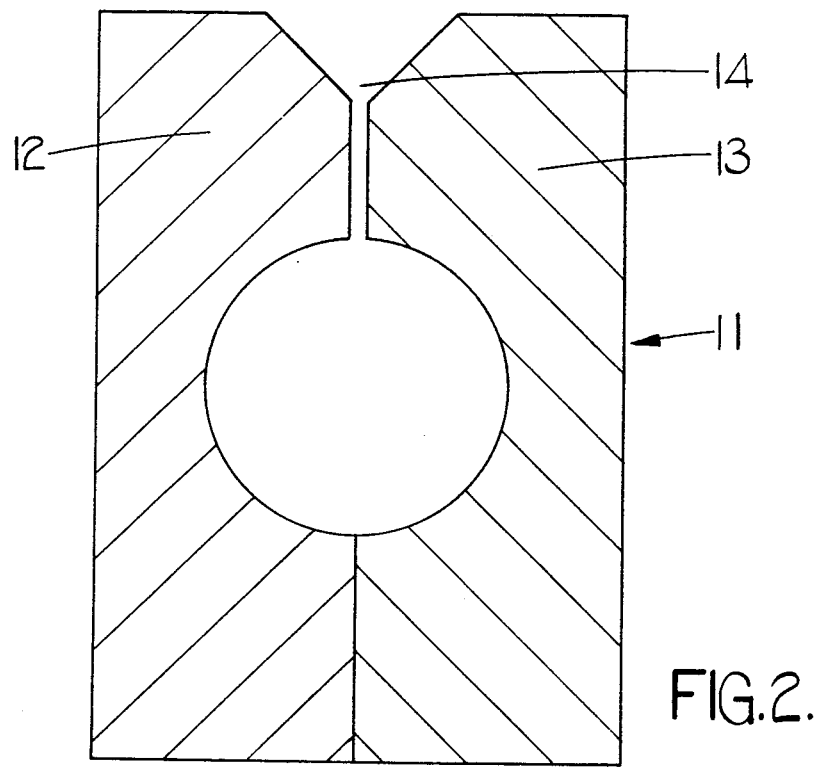
FIG. 2 is a sectional view taken along line A—A of FIG. 1.
Figure 3:
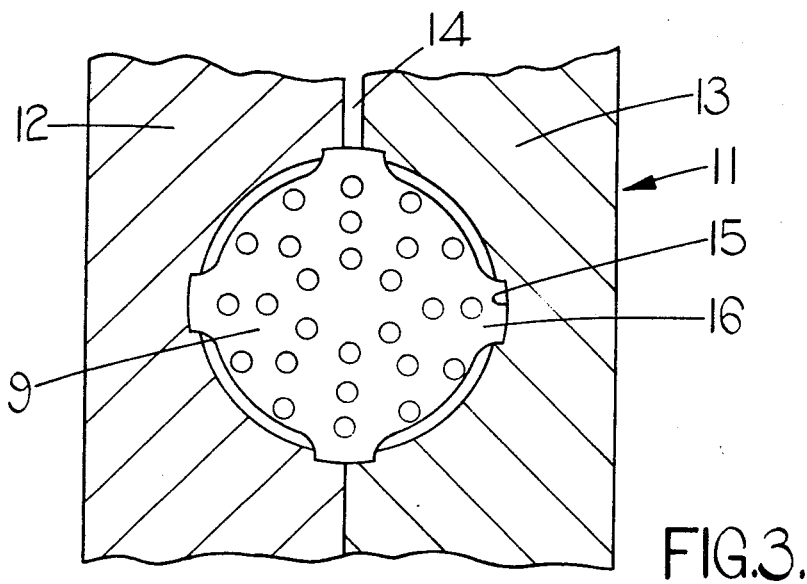
FIG. 3 is a section on the line B—B of FIG. 1.

The above described heat exchanger is manufactured, in this embodiment, by performing the following steps:

1. Referring to FIG. 1, an assembly of tubes 5, polystyrene fugitive tube plates 6 and 7 metal baffle plates 8, 9 and 10 is inserted into a first mould 11. The mould 11 is formed in two parts 12 and 13 provided with a funnelled pouring and vent slot 14 (see FIG. 2). Recesses 15 are provided in the mould parts 12 and 13 to accommodate tags 16 on he baffle plates 8, 9 and 10. Cavities 4 define the internal form of header tanks. Otherwise, the first mould 11 defines the internal form of the casing and header tanks (channels) of the completed heat exchanger together with the internal form of additional end spigots used in a later stage in the process for location in a fugitive second mould.

2. The first mould 11 with the tube and plate assembly mounted therein is filled with a fugitive, low melting point alloy, such as CERROSAFE which has a melting point of about 81°C, through the slot 14. The molten alloy fills the mould 11 and thus surrounds the plates 6, 7, 8, 9 and 10 and also adopts the internal form of the casing and header tanks.

3. The alloy is allowed to solidify and the assembly of tubes, 5 plates 6, 7, 8, 9 and 10, and solid alloy 4 is removed from the first mould 11. Any flashing on the casting is broken off and the casting is trimmed.

4. The assembly is immersed in a solvent (APPLIED 802 — sold by Applied Chemicals Limited) so as to dissolve the polystyrene tube plates 6 and 7, and then cleaned and dried.

5. Referring to FIGS. 4 and 5, the resultant assembly is then inserted into a second mould 21 which takes the form of an injection moulding die which defines the external form of the casing and the header tanks of the completed heat exchanger. The resultant assembly includes the tubes 5 and the fugitive, solid alloy 17. The mould 21 if formed in two parts 22 and 23. At this stage, any necessary screwed inserts, etc., are included in the mould and, depending upon the design of the heat exchanger, additional bosses and inserts may be required between baffle positions to allow for easy removal of the low melting point alloy subsequently.

6. The second mould 21 is maintained at a temperature of about 20° – 30°C, and molten ARYLON T at 265°C is injected into the second mould so as to occupy the spaces left by the dissolved tube plates 6 and 7 and also to adopt the external form 24 of the casing and header tanks.

After solidification of the ARYLON T, which is a thermoplastic material, the moulding is removed from the second mould, the screwed inserts are removed and any plastic flashing is trimmed off. In this embodiment, the heat exchanger has a length of 10inches, an internal diameter of 3 inches and a casing thickness which varies between ¼ inch and ½ inch.

7. The moulded assembly is then placed in a water bath to melt out the solid low melting point alloy 17. The heat exchanger is suitably orientated to ensure complete removal of the alloy.

It is to be appreciated that the low melting point alloy is not melted during the injection moulding process due to the large thermal mass and conductivity thereof which ensures that heating of the alloy to its melting temperature will not occur during the relatively quick injection moulding process.

The use of CERROSAFE alloy is preferred because its low melting point enables it to be melted in a water bath. In place of CERROSAFE, Rose's metal (melting point 99°C) may be employed successfully using polypropylene in the place of ARYLON T. CERROBASE (m.p. 124°C) may be used alternatively with a relatively high melting plastic material such as ARYLON T. CERROSAFE may also be used with polypropylene in the place of ARYLON T.

It is to be appreciated however, that the choice of mutually suitable materials depends upon the mass of the heat exchanger shell to be moulded.

Depending upon the melting point of the solid material to be removed, the moulded assembly may be placed in a hot oven or in a bath of liquid.

Alternatively, the nature of the solid material may be chosen so that it can be removed by dissolving and/or disintegrating techniques.

In place of polystyrene tube plates, cardboard tube plates may be employed, these being subsequently removed by disintegration in a warm alkaline solution.

In a modification of the method described above, the first mould is shaped so as to define only the internal form of the casing of the heat exchanger and not the internal form of the headers. Similarly, the second mould is shaped to define the external form of only the casing and not the headers. The headers, in this modification, are added during a subsequent operation.

In a further modification, the first and second moulds are shaped so as to allow only the headers and tube plates to be moulded while the casing is added as a subsequent operation.

In a still further modification, baffle plates which can be dissolved or chemically disintegrated like the tube plates are employed so that an additional operation of forming the baffle plates separately is not required.

In the first embodiment described above with reference to the drawings, the baffle plates 8, 9 and 10 shown therein are arranged for a radial flow heat exchanger with disc and doughnut baffles. The disc baffles are shown to have local tags that are embedded in the casing during the injection moulding process. It is possible to dispense with these tags and use a more conventional baffle locating method of spacer tubes fitted at suitable points between baffles. Another alternative is to use plastic baffles formed of, for example, ARYLON T and, in this case, they could be located by local tags that are welded into the casing during the injection moulding process. In place of local tags, the metal disc baffles may be located by spaced tubes or they could be secured to the tubes by allowing the low melting point alloy that is used during the process to form a soldered joint between the tubes and the baffles. Similar techniques could be used for baffle plates which are D-shaped form.

It is also possible to manufacture heat exchangers with guide plates spaced in between the baffles. In such cases, the guide plates are located in position and to form a suitable heat transfer bond to the tube by using the low melting point alloy as a solder in the same way as was described above for securing metal baffles.

The tubes, instead of being of circular cross section as shown in the drawings, could be of any other desired cross section and can have additional cooling surfaces on either their insides or outsides.

The inclusion of metal or other reinforcing material at the injection moulding stage in order to strengthen the component is also envisaged.

In an alternative arrangement, the tubes and baffles can be cast into the low melting point alloy block using dummy tube plates which are arranged so as to leave short lengths of tube projecting from the ends of the block of low melting point alloy. When this casting is then used in the injection moulding tool, two further end castings would be required of low melting point alloy to form the inside shape of the header tanks.

The invention is also suitable for the manufacture of hollow articles having a complex internal configuration, for example valve bodies, where it is not possible to form such articles easily by conventional moulding techniques.

I claim:

1. A method of manufacturing a heat exchanger comprising the steps of: temporarily supporting a plurality of tubes by means including at least one removable, fugitive tube plate; inserting at least a portion of the temporarily supported tubes into a first mould which defines the internal form of at least a portion of a shell and channel of a heat exchanger; feeding a flowable, solidifiable, fugitive material into the first mould so as to abut both sides of at least one fugitive tube plate and be moulded to said internal form; allowing said solidifiable material to solidify so that the tubes are held in position by said material, the material covering and filling spaces between the tubes; removing the tubes and solid material from the first mould; removing said at least one fugitive tube plate while leaving said solid material intact; inserting at least a portion of the tubes and solid material into a second mould which defines the external form of a portion of a shell and at least one channel of the heat exchanger; feeding a settable material into the second mould so as to occupy space previously occupied by the fugitive tube plate and also be moulded to said external form in a cavity between the surfaces of said second mould and said fugitive material; allowing the settable material to set; removing the tubes; set material and solid, fugitive material from the second mould; and removing the solid, fugitive material from the set material to leave the tubes supported by the set material.

2. The method according to claim 1, wherein the solid, fugitive material is removed from the set material by a melting technique.

3. The method according to claim 1 wherein the solid, fugitive material is removed from the set material by a dissolving technique.

4. The method according to claim 1 wherein the solid, fugitive material is removed from the set material by a disintegrating technique.

5. The method according to claim 1, wherein the fugitive tube plate is removed by a dissolving technique.

6. The method according to claim 1, wherein the flowable solidifiable, fugitive material is fed into the first mould in molten form.

7. The method according to claim 6, wherein the flowable, solidifiable, fugitive material is an alloy.

8. The method according to claim 1 wherein the settable material is fed into the second mould in molten form.

9. The method according to claim 8, wherein the settable material is a thermoplastic material.

10. The method according to claim 1, further comprising the step of inserting removable baffle plates onto the tubes before inserting the at least portion of the temporarily supported tubes into the first mould and removing said removable baffle plates before inserting the at least portion of the tubes and solid material into the second mould.

11. The method according to claim 10 wherein the removable baffle plates are formed of a material which can be disintegrated by solvent action.

12. The method according to claim 10 wherein the removable baffle plates are formed of a material which can be disintegrated by chemical action.

13. A method of manufacturing a heat exchanger comprising the steps of: temporarily supporting a plurality of tubes by means including at least one removable, fugitive tube plate; inserting at least a portion of the temporarily supported tubes into a first mould which defines the internal form of a shell of a heat exchanger; feeding a flowable, solidifiable, fugitive material into the first mould so as to abut both sides of at least one fugitive tube plate and be moulded to said internal form; allowing said solidifiable material to solidify so that the tubes are held in position by said material, the material covering and filling spaces between the tubes; removing the tubes and solid material from the first mould; removing said at least one fugitive tube plate while leaving said solid material intact; inserting at least a portion of the tubes and solid material into a second mould which defines the external form of a shell of the heat exchanger; feeding a settable material into the second mould so as to occupy space previously occupied by the fugitive tube plate and also be moulded to said external form in a cavity between the surfaces of said second mould and said fugitive material; allowing the settable material to set; removing the tubes, set material and solid, fugitive material from the second mould; and removing the solid, fugitive material from the set material to leave the tubes supported by the set material.

14. A method of manufacturing a heat exchanger comprising the steps of: temporarily supporting a plurality of tubes by means including at least one removable, fugitive tube plate; inserting at least a portion of the temporarily supported tubes into a first mould which defines the internal form of at least one channel of a heat exchanger; feeding a flowable, solidifiable, fugitive material into the first mould so as to abut both sides of at least one fugitive tube plate and be moulded to said internal form; allowing said solidifiable material to solidify so that the tubes are held in position by said material, the material covering and filling spaces between the tubes; removing the tubes and solid material from the first mould; removing said at least one fugitive tube plate while leaving said solid material intact; inserting at least a portion of the tubes and solid material into a second mould which defines the external form of at least one channel of the heat exchanger; feeding a settable material into the second mould so as to occupy space previously occupied by the fugitive tube plate and also be moulded to said external form in a cavity between the surfaces of said second mould and said fugitive material; allowing the settable material to set; removing the tubes, set material and solid, fugitive material from the second mould; and removing the solid, fugitive material from the set material to leave the tubes supported by the set material.

* * * * *